May 24, 1966 — G. F. C. BURKE — 3,252,723
CABLE LACING METHODS
Filed March 2, 1964 — 3 Sheets-Sheet 1
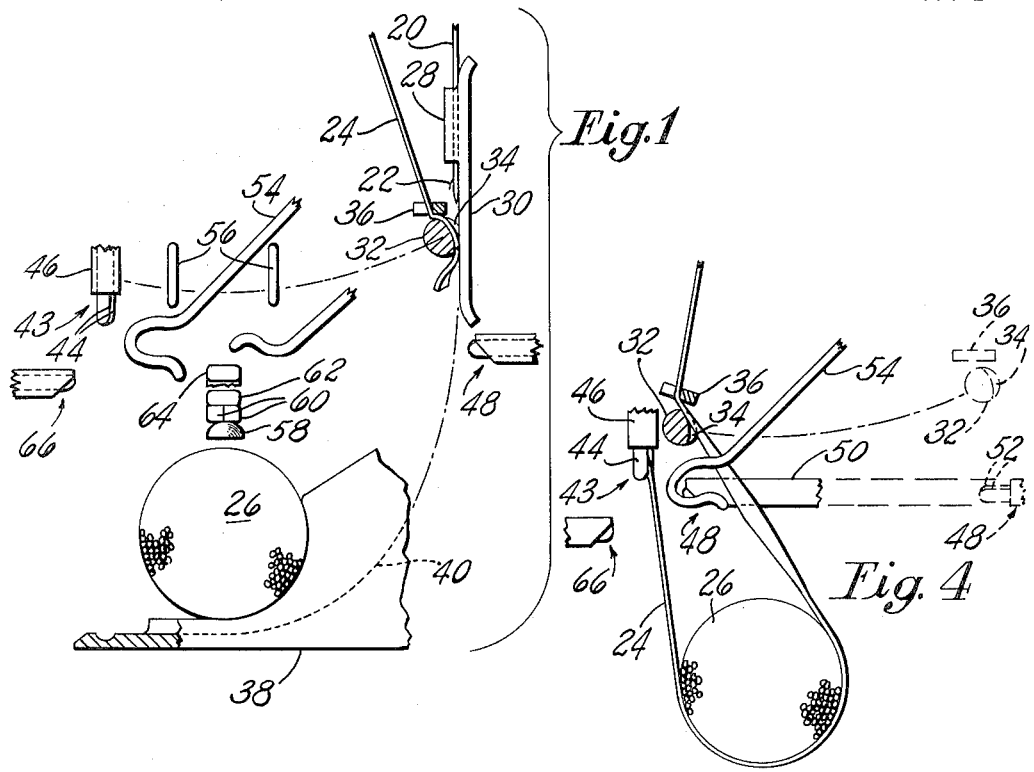
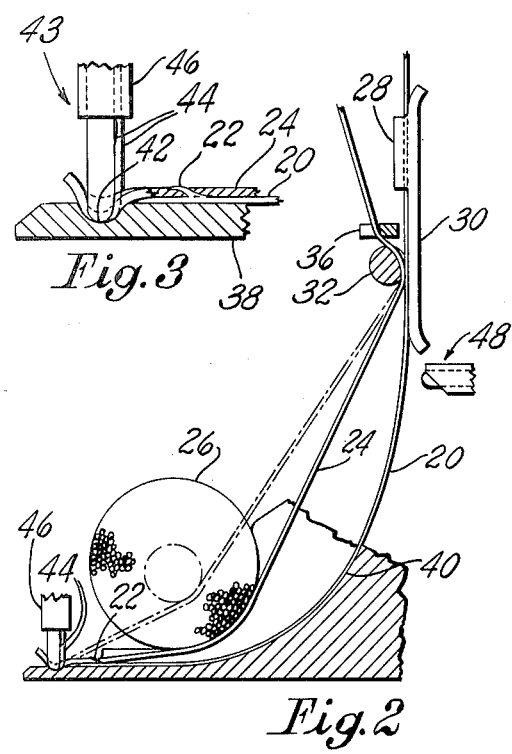
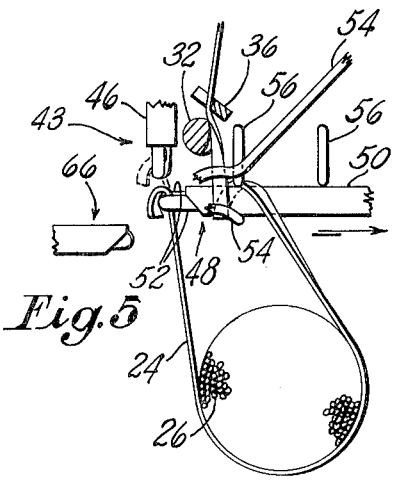
Inventor:
George F. C. Burke
By his Attorney
Maurice R. Boiteau

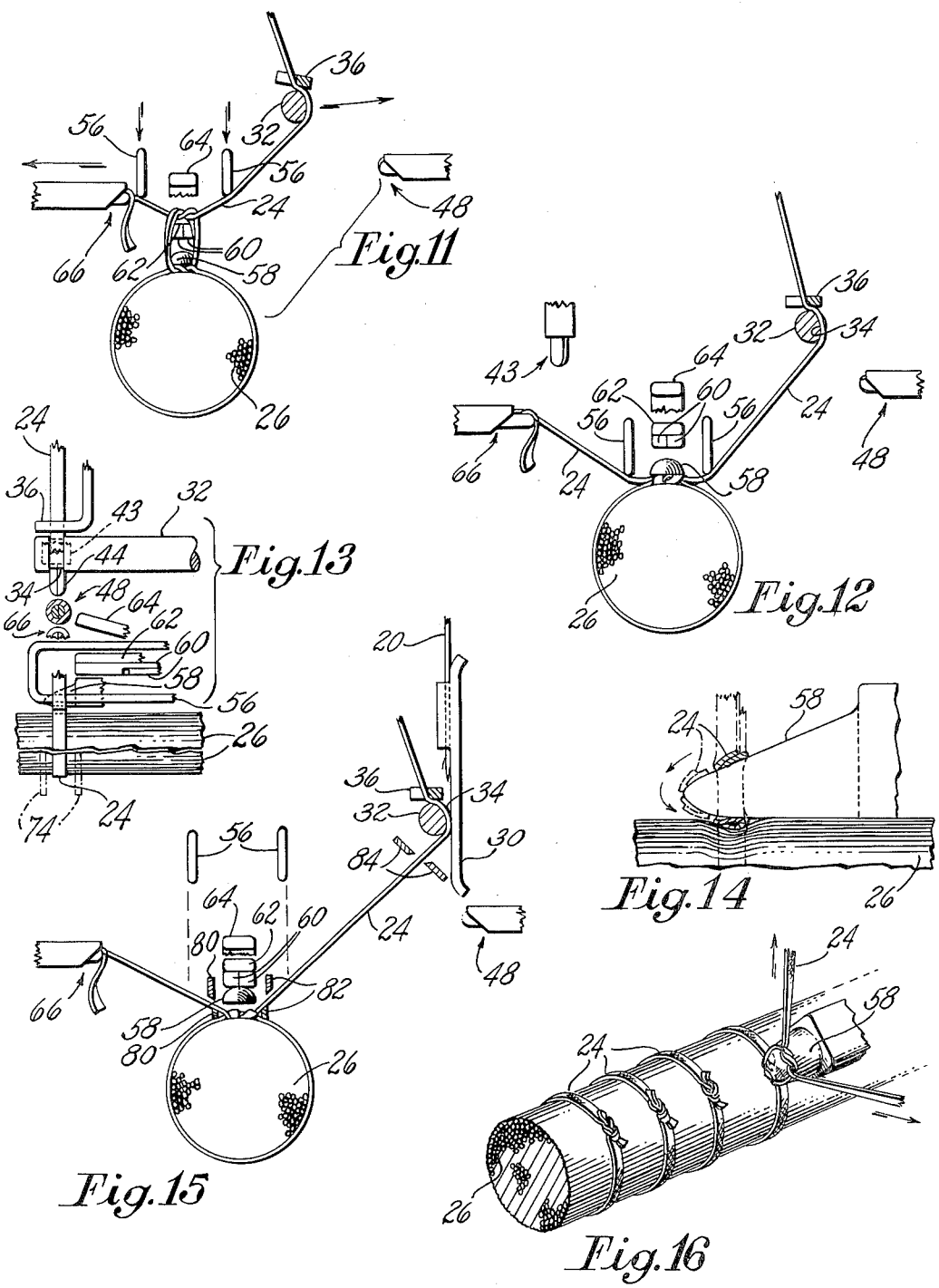

United States Patent Office 3,252,723
Patented May 24, 1966

3,252,723
CABLE LACING METHODS
George F. C. Burke, Beverly, Mass., assignor to United Shoe Machinery Corporation, Boston, Mass., a corporation of New Jersey
Filed Mar. 2, 1964, Ser. No. 348,488
10 Claims. (Cl. 289—1.5)

This invention relates generally to methods of tying knots and more particularly to a method of tightly securing together by means of a flexible strand the component parts of a bundle, such as the individual wires comprising a cable or wiring harness.

Heretofore the assembly of wiring harnesses has largely been manually performed and has required the application of considerable skill. It has accordingly been tedious, expensive, subject to wide variations in the quality of the product and, in spite of the amount of care in manufacturing, the quality of the product is not retained during extended periods of severe usage.

The typical conventional method of assembly of wiring harnesses or cables, terms which in this application are used interchangeably, begins with the laying out of a form defined by pegs or nails inserted into a board. Wires of predetermined length, gage, and insulation color are then laid into the form to define the trunk and branches of a wiring harness. Thereafter the harness is tied with a flexible strand in the form of a braided tape and after the tying is completed the harness is removed from the form. The tying is conventionally performed using a single length of strand, forming half hitches at somewhat regular intervals, and running the strand longitudinally along the bundle of wires between hitches. Accordingly slippage of a single hitch can cause serious loosening of all the ties. In addition, considerable skill is required so that the compressive or binding force exerted by each hitch individually and by all the hitches collectively is within closely controlled limits, not sufficiently high to damage insulation of the individual wires and yet tight enough so that the cable or harness does not easily become loose as a result of handling or in service.

In view of the foregoing it is an object of the present invention to provide a method of binding together the wires of a harness or cable by means of individually tightened and independent strand ties.

Another object is to provide a method by means of which a cable or harness may be securely bound with individual bindings locked against slippage and consequent loosening.

Another object is to provide a method for forming independent ties about a cable and in which each tie is secured by means of a square knot.

Still another object is to provide a method of forming a square knot tight against a bundle of relatively incompressible wires comprising a cable and to perform the tying operation according to a method susceptible of being accomplished by machine.

Yet another object is to form tight strand bindings about a relatively incompressible article such as a cable and in which the degree of tightness may be readily controlled and loss of tightness prevented in locking the tie after tensioning.

In the achievement of the foregoing objects, the leading end of a strand is carried around a cable to a point a slight distance from the cable and adjacent a portion of the strand intermediate the cable and the strand supply. A loop is then formed from the intermediate portion and the leading end drawn through the loop to form the first half of a square knot. Thereafter another loop is formed in an intermediate portion of the strand more distant from the cable than the first and the leading end passed through the second loop to form the second half of the square knot which is temporarily maintained in spaced relationship with the first thus defining a closed loop between the second and the first halves. The second half of the knot is then tightly clamped so as to prevent relative slippage between the leading end and intermediate portions of strand and while the second half is so clamped the closed loop between the first and second halves is expanded to cause the first half to be tightened against the cable. The now tightened first half is clamped preferably but not necessarily, against the cable to prevent slippage of the strand and while the first half is clamped the second half is tightened against the first to form a completely locked square knot against the cable.

In binding cables with conventional braided tape it is convenient in the practice of the present method to carry the leading end portion of the tape from a point at one side and above the cable to the other side by means of a bodkin thereby requiring that the cable be displaced a minimum from its supporting surface. It will also be seen that in the practice of the method as above outlined accurate binding tension may be obtained by controlling the spreading force applied to the closed loop between the halves of the knot.

The present invention will be more fully understood and numerous advantages appreciated from a detailed description of successive steps of an illustrative method taken in connection with the accompanying drawings in which—

FIG. 1 is a view of the relative positions before a binding operation of implements employed for binding a cable with flexible strand in accordance with the present method;

FIG. 2 is a view partly in section illustrating some of the implements of FIG. 1 and showing the function of a bodkin in carrying the leading end of the strand partially around the cable;

FIG. 3 is a detail view on an enlarged scale showing the leading end being picked up from the bodkin by a pincer;

FIG. 4 is a view similar to FIG. 2 showing the relative positions of the leading and intermediate portions of the strand prior to forming a first half of a square knot;

FIG. 5 is a view similar to FIG. 4 showing the formation of the first half of a square knot between the leading end and intermediate portions of the strand;

FIG. 11 is a view similar to FIG. 10 showing the continued clamping of the first half of the knot against the cable while the expanded loop is being contracted by sliding the second half of the knot;

FIG. 12 is a view similar to FIG. 11 showing the second half of the knot tightened against the first;

FIG. 13 is a detail view of the implements as seen from a direction normal to the axis of the cable;

FIG. 14 is a detail view also taken in a direction normal to the axis of the cable and showing the progress of the second half of the knot from a position illustrated in FIG. 11 to that of FIG. 12;

FIG. 15 is a view similar to FIG. 11 showing severing of the tightened strand binding the cable from the supply; and FIG. 16 is a view in perspective showing a cable having several ties accomplished in accordance with the present method.

Figure 6:
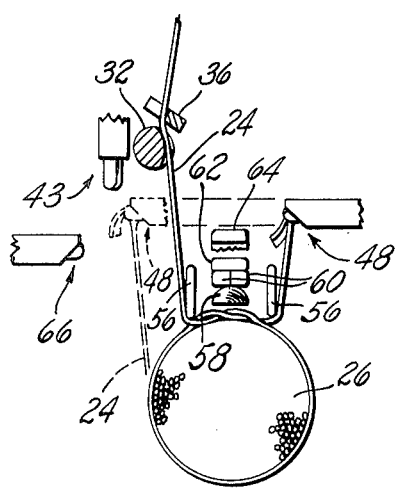
FIG. 6 is a view similar to FIG. 5 showing the completion of the first half of the square knot.

Referring to the drawings and particularly to FIG. 1 there is seen a set of implements for carrying out the novel method. These implements include a bodkin 20 which is in the form of a thin, flexible, narrow steel tape formed at its leading end with a punched, forwardly-extending hook or barb 22. The bodkin 20 is employed for carrying a strand in the form of a braided tape 24 partially around a bundle of wires 26 forming the trunk or a branch of a wiring harness.

At the time that the binding operation is performed on the harness it has been prepared in a conventional manner by depositing the required number of individual wires of predetermined length, color and size in a form or cradle not shown but defined on a flat surface, such as a board, by a series of pegs or nails arranged at variable intervals along each side of the preliminary path for the harness. In some cases the pegs are closely spaced to permit successive break outs or branches from the trunk to be located with the required accuracy at relatively close longitudinal intervals.

For carrying the strand 24 about the bundle or cable 26 the strand is impaled upon the barb 22 as the bodkin 20 descends past the leading end of the strand. The bodkin 20 is vertically slidable in a stationary guideway 28 formed with an integral depending apron 30 which prevents the bodkin from being deflected outwardly or to the right as seen in FIG. 1 and thus miss the strand in its downward movement. For presenting the leading end of the strand 24 to the barb 22 there is included among the implements a cylindrical anvil 32 movable in an arc about an axis parallel to that of the cable 26. The anvil 32 is formed with a slot 34 of a width and depth adapted to receive and maintain the strand 24 aligned with the bodkin 20. Cooperating with the anvil 32 is an L-shaped friction finger 36 also seen in FIG. 13, movable relative to the anvil 32 so as to apply and release friction as required upon the strand which passes between the underside of the finger 36 and the anvil 32. In addition, control of the strand is also maintained by a take up of conventional design (not shown) through which the strand passes at a point above the finger 36 and subjects the strand to constant light tension.

In performing the novel method, the initial step is that of raising that part of the cable 26 about which a tie is to be formed, slightly above the lay-out board upon which it normally lies. For this purpose, a support 38 is pushed under the cable from the side as shown in FIG. 2. The support 38 is slotted at 40 to provide an arcuate guideway for the bodkin 20 which, as the first step in the actual tying process, is lowered and guided from the position above and to the right of the cable as seen in FIG. 1 to the position of FIG. 2 below and to the left of the cable. During the descent of the bodkin 20, the finger 36 is raised out of contact with the anvil 32 so that the strand 24 is carried partially around the bundle by the bodkin against the minimum resistance provided by the conventional take-up already mentioned.

The strand 24 is carried by the bodkin in such a way that the leading end extends forwardly beyond the end of the bodkin and there is provided in the support 38 a depression 42 (FIG. 3) to assist in presenting the leading end to a vertically movable pincer (indicated generally at 43) and comprising a pair of opposing spring jaws 44 slidable inside a sheath 46. As the pincer is lowered the sheath 46 is retracted permitting the jaws to open. As the jaws 44 bridge the strand at the depression 42, the sleeve 46 is lowered to close the jaws and thus grip the leading end of the strand. The pincer 43 is then raised to the position depicted in FIG. 4 in preparation for the formation of a square knot which in the practice of the present method is formed in two steps and tightened against the bundle of wires in a novel manner hereafter to be described.

For forming the first part of the square knot a pair of implements are employed. These implements consist of a first horizontal pincer indicated generally at 48 in FIG. 4. The pincer 48 which includes a tubular sheath 50, and spring jaws 52, shown in FIG. 5, normally maintained almost completely retracted within the sheath, has an inoperative position to the right slightly beyond the path of the bodkin 20. In preparation for the formation of the knot however, the pincer 48 is advanced to a position close to that portion of the strand 24 extending between the bundle and the pincer 43. Accompanying the movement of the pincer 48, the anvil 32 and the cooperating finger 36 are swung from their original position in which the leading end of the strand was presented to the bodkin 20, to the opposite end of their arc of travel close to the pincer 43. The finger 36 continues to guide the strand 24 without tight frictional engagement in the position depicted in FIG. 4. The new position of the anvil 32 and the finger 36 results in an angular orientation with respect to the sheath 50 of that part of the strand 24 lying between the anvil and the bundle 26 to facilitate subsequent operations.

A looper 54 in the form of a hook having an obliquely oriented shank is employed for imparting a helical turn to the strand 24 about the sheath 50. The strand 24 is positioned to form a right hand helix on the sheath 50 as seen in FIG. 5. After the strand has been so arranged about the sheath 50, the jaws 52 are extended outwardly from the sheath 50, opened and the pincer slightly advanced thus to straddle the strand 24 below the pincers 43 and to grip the strand by closing the jaws before the pincer 43 is opened to release the leading end of the strand.

After the leading end of the strand has been gripped by the pincer 48 a pair of strippers 56 in the form of wire loops as shown in FIGS. 6 and 13 are advanced into operative relationship above the sheath 50. The pincer 48 is then retracted through the helically formed turn previously wound about the sheath 50 thereby forming the first half of a square knot about the leading end portion of the strand. The strippers 56 are then lowered as seen in FIG. 6 to bring the first half of the knot loosely into contact with the bundle 26.

After the first half of the square knot has reached the position depicted in FIG. 6, a novel group of implements is brought into play to control intermediate steps in the formation of the knot, its tightening and final locking in place. This group of implements comprises a nose 58, a pair of spreaders 60 and lower and upper grippers 62 and 64 respectively. The nose 58, the spreaders 60 and the lower gripper 62 are advanced over the first half of the knot in preparation for the formation of the second half of the knot, but the first half of the knot is not immediately tightened against the bundle 26.

Figure 7:
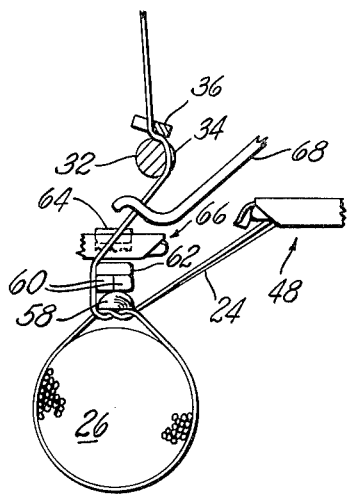
FIGS. 7 and 8 are views similar to FIGS. 4 and 5 showing steps in the formation of the second half of the square knot.

The anvil 32 and the finger 36 as shown in FIG. 7 are swung to an intermediate position slightly to the right of a vertical axial plane of the cable 26 and the finger 36 is brought into frictional engagement with the strand 24 at the anvil 32. A third pincer indicated generally at 66 and horizontally movable at a level slightly below that of the pincer 48 is advanced to a position almost directly below that of the anvil 32. Under these conditions the portion of the strand 24 between the upper left hand corner of the gripper 62 and the anvil 32 passes forwardly of and at an angle to the axis of the pincer 66. After the strand 24 has been so positioned a second looper 68 is actuated to form a left hand helical loop about a sheath 70 of the pincer 66. In order to supply strand for the action of the looper 68, the finger 36 releases friction on the strand at the anvil 32. Thereafter the operation of the looper 68 in forming the second half of the knot in the position depicted in FIG. 8 is generally similar to that of the looper 54 as already described for the first half of the knot in connection with FIGS. 4 and 5.

Figure 8:
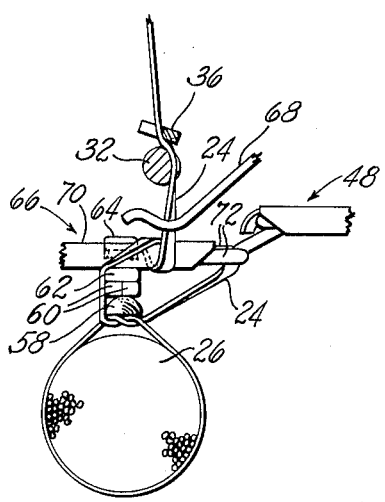

Contained within the sheath 70 of the pincer 66 are jaws 72 which, as shown in FIG. 8, are extended from the sheath to grip the strand 24 near the pincer 48. As this is happening the sheath 70 lies immediately above the lower gripper 62, the spreaders 60 and the nose 58 but the upper gripper 64 is retracted behind the sheath.

Figure 9:
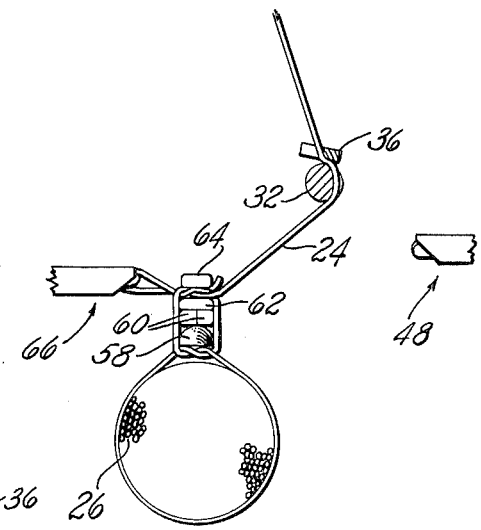
FIG. 9 is a view similar to FIG. 8 showing the clamping of the second half of the knot to define a loop between the first and second halves of the knot.

As seen in FIG. 9, the finger 36 is brought into frictional engagement with the anvil 32 and both the anvil and finger are swung to the right as the pincer 66 is moved to the left of the nose 58 carrying the leading end of the strand 24 through the loop shown in FIG. 8. Because successive gripping of the leading end of the strand by the pincers 43, 48 and 66 has been accomplished by gripping the strand between the cable and the pincer, the end of the strand extending beyond the pincer 66 is considerably greater than that extending beyond the pincer 43 shown in FIG. 5. The result is that a closed loop is formed including the leading end of the strand which is temporarily included in the second half of the square knot.

At this point in the practice of the method the upper gripper is advnaced to overlie the lower gripper 62 and lowered to clamp the second half of the square knot against the lower gripper. As seen in FIG. 9, there is a closed loop surrounding the strand controlling instrumentalities consisting of the nose 58, the spreaders 60, and the lower gripper 62, and the second or upper half of the knot is firmly clamped to prevent relative motion between the leading and intermediate portions of the strand.

Figure 10:
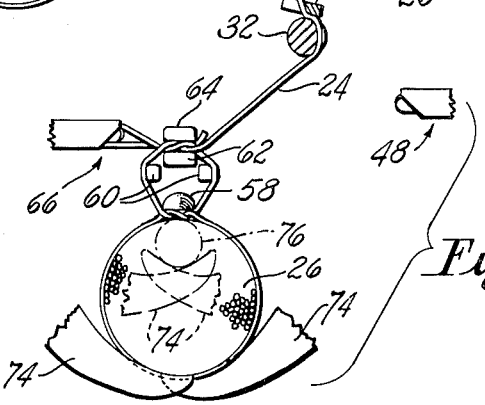
FIG. 10 is a view similar to FIG. 9 showing the spreading of the loop to tighten the first half of the knot against the cable after which it is clamped.

A pair of lifters 74, shown in FIG. 10, are employed later in the practice of the method to cooperate with the nose 58 for holding the first half of the square knot temporarily until the second half of the knot is locked in position. The members 74 are spaced apart as seen in FIG. 13 along the axis of the cable 26 so that the path of the bodkin 20 and the strand 24 lies between them. In the dash line position, the lifters 74 are shown supporting a cable 76 of minimum diameter depicted in dot and dash lines. The members 74 by pressing upwardly upon a cable ranging in size from the cable 26 to the cable 76 of FIG. 10, render the method applicable to the full range of sizes between these limits.

The spreaders 60 are employed for opening the loop between the two halves of the square knot as shown in FIG. 10. At this time the lifters 74 press lightly upon the cable so that the strand 24 encircling the cable is free to be tightened while the second half of the square knot is locked between the grippers 62 and 64. The outward motion of the spreaders 60 may be achieved under controlled conditions in which the expanding force is limited to obtain a predetermined compressive force upon the cable 26. This control may be readily achieved by employing a spring loaded mechanism for actuating the spreaders.

After the spreaders 60 have been completely actuated the cable is maintained in raised position by the fingers 74 while the nose 58 is lowered to clamp the first half of the knot between the cable and the nose. It will be appreciated that in tying cables comprising wires having a thick, soft and yielding insulation the first half of the knot may be clamped between two members consisting of an anvil (not shown) and the nose 58, without relying upon the resistance of the cable for clamping. The introduction of an anvil between the knot and the cable and its subsequent removal from beneath the knot causes a degree of loosening which can only be taken up by the resiliency of thick insulation.

After the first half of the knot has been tightened as described with reference to FIG. 10 the upward force on the cable 26 is maintained to lock the first half of the knot between the cable and the nose 58. The spreaders 60 are then returned to their closed positions, the upper gripper 64 is raised and the spreaders and both the grippers 62 and 64 are retracted rearwardly or to the right as seen in FIG. 13, in preparation for the tightening and locking of the second half of the knot against the first. This is accomplished as seen in FIG. 11 by the pincer 66 pulling on the leading end of the strand while the portion of the strand running back to the supply from the second half of the knot is controlled by the anvil 32 with the finger 36. As the pincer 66 moves to the left to tighten the leading end, and the anvil 32 and finger 36 move to the right to tighten the intermediate portion, the strippers 56 are lowered to the position depicted in FIG. 12. Because the forward end of the nose 58 is slanted as seen in FIGS. 14 and 16, the combined action of pulling the two ends of the second half of the knot and the action of the strippers 56 causes the second half to slip forwardly over the forward end of the nose and under the end to be locked in contact with the first half. As the second half of the knot reaches the locked position the upward pressure of the lifters 74 or the downward force of the nose 58 may be reduced slightly to facilitate the sliding of the second half of the knot under the nose.

As shown in FIG. 15, the square knot is locked in position, the nose 58 no longer necessary has been raised from the cable and pairs of blades 80, 82 and 84 are employed for cutting the strand 24 to complete the binding operation. The blades 80 sever that portion of the strand extending from the cable to the pincer 66 close to the knot. The second pair of blades 82 severs the strand running from the cable to the supply close to the other side of the knot. In order to prepare the leading end of the strand for impalement upon the bodkin 20, the strand is cut near the anvil 32 by the blades 84.

The operation already described is repeated at each strand 24 along the cable 26 as shown in FIG. 16.

It will be appreciated from the foregoing description of an illustrative method that the invention is applicable to other purposes. It is therefore not intended that the illustration be taken as a limitation but rather that the scope of the invention be defined by the appended claims.

Having thus described my invention what I claim as new and desire to secure by Letters Patent of the United States is:

1. A method of tightly securing together a bundle of elongated relatively incompressible articles such as wires of a cable, comprising the steps of encircling the bundle with a flexible strand extending from a supply to a leading end, wrapping an intermediate portion of the strand about the leading end to form the first half of a square knot near the bundle, wrapping another intermediate portion of the strand more remote from the bundle than the first intermediate portion about the leading end to form the second half of a square knot in spaced relationship with the first half thereby creating a closed loop between the two halves of the knot, clamping the second half of the knot to prevent relative motion between the leading and intermediate portions of the strand, spreading the loop to cause sliding of the first half of the knot and tightening of the encircling strand against the bundle, clamping the tightened first half of the knot against the bundle and while the first half of the knot is thus clamped relatively sliding the strand portions comprising the second half for tightening the second half of the square knot against the first.

2. A method of tightly securing together a bundle of elongated relatively incompressible articles such as wires of a cable, comprising the steps of carrying the leading end of a flexible strand extending from a supply, to a point near an intermediate portion of the strand thereby encircling the bundle, wrapping the intermediate portion of the strand about the leading end to form the first half of a square knot near the bundle, wrapping another intermediate portion of the strand more remote from the bundle than the first intermediate portion about the leading end to form the second half of a square knot in spaced relationship with the first half thereby creating a closed loop between the two halves of the knot, clamping the second half of the knot to prevent relative motion between the leading and intermediate portions of the strand, spreading the loop to cause sliding of the first half of the knot and tightening of the encircling strand against the bundle, clamping the tightened first half of the knot and while the first half of the knot is clamped, relatively sliding the strand portions comprising the second half to bring the second half into a tight relationship with the first.

3. A method of securing together a bundle of elongated relatively incompressible articles such as wires of a cable under a predetermined binding force, comprising the steps of encircling the bundle with a flexible strand extending from a supply to a leading end, wrapping an intermediate portion of the strand about the leading end to form the first half of a square knot near the bundle, wrapping another intermediate portion of the strand more remote from the bundle than the first intermediate portion about the leading end to form the second half of a square knot in spaced relationship with the first half thereby creating a closed loop between the two halves of the knot, clamping the second half of the knot to prevent relative motion between the leading and intermediate portions of the strand, applying a spreading force greater than but proportional to the binding force to the loop to cause sliding of the first half of the knot and tightening of the encircling strand against the bundle with the predetermined binding force, clamping the first half of the knot against the bundle and while the first half of the knot is thus clamped relatively sliding the strand portions of the second half for tightening the second half of the square knot against the first.

4. A method of tightly securing together a bundle of elongated relatively incompressible articles such as wires of a cable, comprising the steps of providing a supply of braided flexible strand terminating in a leading end, impaling the leading end on a barbed bodkin, actuating the bodkin to carry the leading end part way to a point adjacent an intermediate portion of the strand, tying a square knot from the leading end and intermediate portions tight against the bundle, cutting the strand at a point remote from the bundle leaving a free end in bodkin impaling position and, before the cutting, returning the bodkin to a position to impale the next leading end of the strand while moving toward the bundle in repeating the method.

5. A method of securing together a bundle of elongated relatively incompressible articles such as wires of a cable lying on a supporting surface, comprising the steps of raising the bundle slightly from the supporting surface, impaling a braided flexible strand on a barbed bodkin, actuating the bodkin to carry the leading end of the strand beneath the cable to a transfer point, picking up the leading end from the bodkin at the transfer point, forming a helical loop of one hand from an intermediate portion of the strand and drawing the leading end of the strand through the loop to form the first half of a square knot, forming a second helical loop of the opposite hand and drawing the leading end of the strand through the second loop to form the second half of the square knot, tightening and locking the square knot against the cable and severing the strand close to the knot.

6. The method of claim 5 in which each of the helical loops is formed around a pincer which is thereafter actuated to grip and draw the leading end through the loop to form a half of the square knot.

7. The method of claim 5 in which tightening of the square knot is accomplished by clamping the second half of the knot in spaced relationship with the first thus forming a closed loop between the two halves and while the second half is so clamped, spreading the closed loop.

8. The method of claim 5 in which the strand is maintained in impaling position to be picked up by the bodkin and as a final step in the practice of the method the strand is also cut near the impaling position to present the strand to the bodkin in repeating the method.

9. The method of claim 5 in which the locking of the square knot is accomplished by sliding the second half of the knot along the tapering surface and under a nose maintained in contact with the cable.

10. The method of claim 5 in which the raising of the cable is effected by a support wedged from a lateral direction under the cable and the bodkin is guided in the support to the transfer point.

References Cited by the Examiner
UNITED STATES PATENTS

| | | | |
|---|---|---|---|
| 262,781 | 8/1882 | Ingledue | 289—4 |
| 664,253 | 12/1900 | Gaynon et al. | 289—4 |
| 743,998 | 11/1903 | Wygant | 289—4 |
| 3,033,102 | 5/1962 | Fryklund | 100—3 X |
| 3,098,670 | 7/1963 | Caveney | 289—17 |
| 3,118,365 | 1/1964 | Rolle et al. | 100—3 |

ROBERT R. MACKEY, *Acting Primary Examiner.*

DONALD W. PARKER, *Examiner.*

L. K. RIMRODT, *Assistant Examiner.*